United States Patent [19]
Hancock et al.

[11] Patent Number: 6,007,682
[45] Date of Patent: Dec. 28, 1999

[54] POWER PROCESSOR CIRCUIT AND METHOD FOR CORONA DISCHARGE POLLUTANT DESTRUCTION APPARATUS

[75] Inventors: Donald Hancock, Thousand Oaks; Weldon S. Williamson, Malibu; John H. S. Wang, Rancho Palos Verdes, all of Calif.

[73] Assignee: Raytheon Company, Lexington, Mass.

[21] Appl. No.: 09/031,109

[22] Filed: Feb. 26, 1998

Related U.S. Application Data

[62] Division of application No. 08/690,000, Aug. 19, 1996, Pat. No. 5,845,488.

[51] Int. Cl.[6] .................................................. B01J 19/08
[52] U.S. Cl. ............................................ 204/164; 204/177
[58] Field of Search ...................................... 204/164, 177

[56] References Cited

U.S. PATENT DOCUMENTS

| | | | |
|---|---|---|---|
| 5,433,832 | 7/1995 | Rich et al. | 204/164 |
| 5,845,488 | 12/1998 | Hancock et al. | 422/186.28 |

*Primary Examiner*—Kishor Mayekar
*Attorney, Agent, or Firm*—Colin M. Raufer; Leonard A. Alkov; Glenn H. Lenzen, Jr.

[57] ABSTRACT

A solid-state power processor circuit and method is used to supply power to generate a discharge in a corona discharge pollutant destruction apparatus. The circuit uses field effect transistors (FETs) and integrated circuit devices based upon metal oxide semiconductor field effect transistor (MOSFET) technology to amplify low-voltage pulse signals to high voltage levels. A resonator in the power processor circuit generates sinusoidal oscillation from the high voltage pulses, and provides the high-voltage, high-frequency electrical power necessary for corona discharge.

2 Claims, 6 Drawing Sheets

POWER PROCESSOR CIRCUIT AND METHOD FOR CORONA DISCHARGE POLLUTANT DESTRUCTION APPARATUS

This is a division of application Ser. No. 08/690,000 filed Aug. 19, 1996, now U.S. Pat. No. 5,845,488.

BACKGROUND OF THE INVENTION

1. Field of the Invention

This invention relates to a power processor circuit and method for supplying power to generate corona discharge in a corona discharge pollutant destruction corona discharge reactor.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the* 1994 *International Conf. on Plasma Science, Jun.* 6–8, 1994, Santa Fe, N.M., paper No. 1E6, page 88. Corona pollutant destruction has also been proposed for liquids, as disclosed in application Ser. No. 08/295,959, filed Aug. 25, 1994, now U.S. Pat. No. 5,549,795, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in U.S. Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

A pollutant destruction system using an inductor-capacitor (LC) resonant circuit for corona discharge generation is described in application Ser. No. 08/450,449, filed May 25, 1995, now U.S. Pat. No. 5,695,619, "Gaseous Pollutant Destruction Apparatus and Method Using Self-Resonant Corona Discharge," and assigned to Hughes Aircraft Company, the assignee of the present invention. The application discloses a single stage corona discharge reactor driven by an LC resonator circuit, which is efficient in converting high-voltage pulse energy to corona discharges.

High voltage pulses are very effective in destroying hydrocarbons (HC) and carbon monoxide (CO), but do not facilitate the reduction of nitrogen oxides ($NO_x$) into diatomic nitrogen ($N_2$) and oxygen ($O_2$). Experiments have shown that using high voltages (up to 12 kV) may even produce some additional $NO_x$. On the other hand, low voltage pulses are highly efficient in reducing $NO_x$, but are very poor at oxidizing HC. Therefore, depending on the treatment desired, a wide range of voltages levels and frequencies may be required.

High voltage and high frequency electricity must be supplied to a corona discharge reactor to generate a corona discharge. The voltage required is usually in the range of about 5–20 kV, and the frequency required is usually in the range of about 5 to 15 MHz. A series resonant inverter with a feedback control loop for generating the required waveform is described in U.S. Pat. No. 4,757,432. Spark gap circuits have been used for generating high voltage pulses for corona discharge, and are described in A. Mizuno et al., "$NO_x$ Removal Process Using Pulsed Discharge Plasma," *IEEE Transactions on Industry Applications,* vol. 31, 1995, pages 957–962, and T. Fujii et al., "Pulse Corona Characteristics," *IEEE Transactions on Industry Applications,* vol. 29, 1993, pages 98–102.

SUMMARY OF THE INVENTION

This invention concerns a power processor circuit for supplying power to generate a corona discharge in a corona discharge pollutant destruction reactor. Several embodiments of the invention utilize discrete solid state field effect transistor (FET) circuits or FET integrated circuits (ICs) to drive high voltage pulses by using direct current (DC) power supplies of only several hundred volts, thereby greatly reducing the volume, weight and cost of the circuits.

In one embodiment, a series resonant inductor-capacitor (LC) circuit is driven by four high power metal-oxide semiconductor field effect transistors (MOSFETs) operating with voltages and currents on the order of 1000 volts and 20 amperes and are connected in a "full bridge" configuration driven by a DC voltage on the order of 900 volts. The LC circuit resonates at about 5–15 MHz. The symmetrically arranged MOSFETs drive the LC resonator, with each MOSFET connected to a driver circuit that comprises multiple parallel stages of FETs. Each FET in the driver circuit is connected to at least one amplification and isolation circuit that receives rectangular pulses from a low-voltage signal source. The isolation circuits used in one embodiment are voltage transformers which isolate currents between the FETs and initial amplifiers. The driver circuit is also isolated from the signal source to protect the signal source from the driver circuit's high voltages and currents. Isolation may be achieved by a remote transmitter/receiver, such as a fiber optic transmitter/receiver link that transmits optical pulse signals from the signal source to the driver circuit but blocks voltages and currents.

In another embodiment, two high power MOSFETs are connected to only one end of a series LC resonator circuit in a "half bridge" configuration and are biased by DC voltages of only about +200 volts. Each MOSFET is connected to a driver circuit comprising multiple parallel stages of high speed FET IC drivers capable of amplifying high frequency pulses. A low-voltage signal source transmits rectangular pulses to the driver circuits but is electrically isolated from them to avoid damage by high voltages and currents. Isolation may be achieved by a fiber optic transmitter/receiver link, for example, or by other remote transmitter/receiver means. In this driver circuit, no voltage transformers are needed, and in each parallel driver stage, only one high speed driver is connected between the fiber optic receiver and the high power MOSFET.

These and other features and advantages of the invention will be apparent to those skilled in the art from the following detailed description, taken together with the accompanying drawings, in which:

DETAILED DESCRIPTION OF THE INVENTION

The present invention concerns power processor circuits which employ discrete solid state field effect transistors (FETs) or FET integrated circuits (ICs) and relatively low DC voltages to generate high-voltage, high-frequency pulses for corona discharge generation. The circuits drive an LC resonator circuit for corona discharge generation by high power FET amplifiers in a power stage, with each high power FET amplifier driven by a driver circuit, which comprises discrete FETs and/or FET ICs, to feed amplified pulses at an intermediate voltage level to the power stage. The high power amplifier circuits are further provided with appropriate isolation circuits if necessary to prevent large voltages and currents in the high power circuits from damaging a low-voltage signal source, which provides a desired pulse waveform of preferably rectangular shape in the time domain. One advantage of using rectangular pulses is that the duty cycle, which is defined as the ratio of pulse width to pulse repetition period, can be easily adjustable in the low-voltage signal source without changing any components or parameters in the high power circuits.

Figure 1:
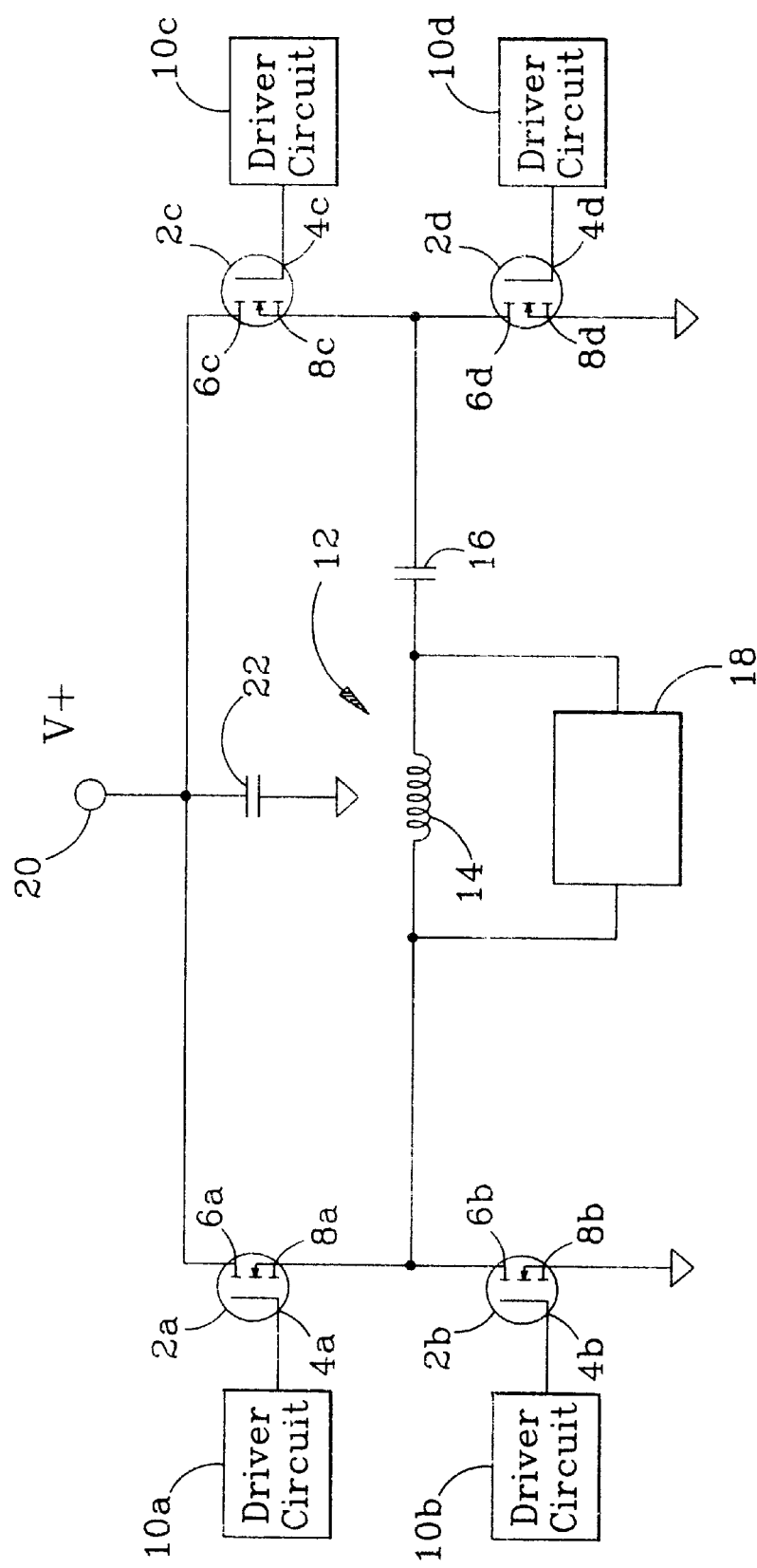
FIG. 1 is a schematic diagram of the power stage for one embodiment of the invention that has a full bridge configuration.

In one embodiment employing a full bridge configuration, the power stage shown in FIG. 1 comprises four high power FETs 2a, 2b, 2c, 2d having respective gates 4a, 4b, 4c, 4d, drains 6a, 6b, 6c, 6d and sources 8a, 8b, 8c, 8d. The high power FETs 2a, 2b, 2c, 2d are preferably n-channel transistors. It is further preferred that the FETs 2a, 2b, 2c, 2d be metal-oxide semiconductor FETs (MOSFETs) because of their ability to produce high power without breakdown when high voltages are applied to the gates. These high power MOSFETs are preferably of the industry type "DE375X2 102N20". The high power FET gates 4a, 4b, 4c, 4d are connected to respective driver circuits 10a, 10b, 10c, 10d to amplify pulses from an intermediate voltage to a high voltage. An LC resonator circuit 12 is formed by an inductor 14 and a capacitor 16 connected in series, and the inductor 14 is connected in parallel with a corona discharge reactor 18. The resonant frequency f generated by the LC resonator circuit 12 is given by $$f = \frac{1}{2\pi\sqrt{LC}}$$

where L is the inductance of the inductor 14 in henrys, C is the capacitance of the capacitor 16 in farads, and f is the resonant frequency in hertz. To generate a desirable resonant frequency of about 15 MHz for optimal corona discharge, the inductor 14 preferably has an inductance of about 4.5 nH and the capacitor 16 preferably has a capacitance of about 25 pF. Although other resonator configurations such as parallel LC resonator circuits are theoretically possible for generating a resonance, it is preferred that the inductor 14 and the capacitor 16 be connected in series to avoid breakdown at the capacitor.

The four high power FETs 2a, 2b, 2c, 2d are arranged symmetrically about the resonator circuit 12 such that FETs 2a, 2b are connected to one end of the resonator circuit 12 while FETs 2c, 2d are connected to the other end. The FETs 2a, 2c have their drains 6a, 6c connected to a DC voltage source 20 which supplies a bias voltage V+, preferably of about +900 volts. A filter capacitor 22 is connected between the DC voltage source 20 and ground to filter out the DC component of an amplified voltage waveform in which the DC component is generated by the bias voltage V+, so that the DC source 20 is not short-circuited to ground. The sources 8a, 8c of the FETs 2a, 2c are connected to the drains 6b, 6d of the FETs 2b, 2d respectively, while the sources 8b, 8d of the FETs 2b, 2d are grounded. The resonator circuit 12 is connected across the sources 8a, 8c of the FETS 2a, 2c, thereby forming a full bridge circuit.

Figure 2:
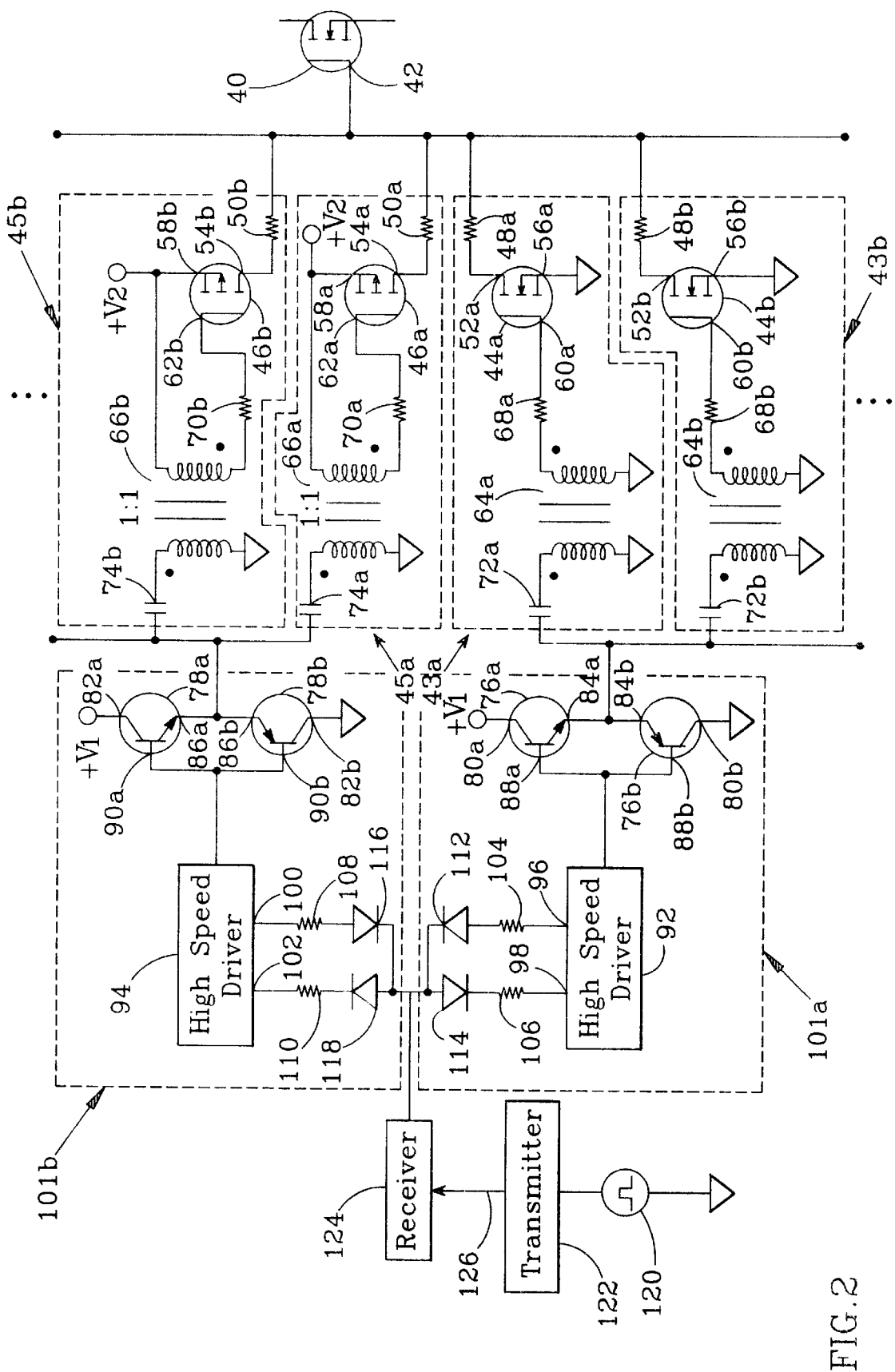
FIG. 2 is a schematic diagram of one of the driver circuits in the power processor circuit of FIG. 1.

One embodiment of the driver circuits 10a, 10b, 10c, 10d is shown in FIG. 2. A high power FET 40, which represents one of the FETs 2a, 2b, 2c, 2d, has a gate 42 that is connected to multiple parallel isolation-amplification stages 43a, 43b with intermediate n-channel FETs 44a, 44b, and to multiple parallel isolation-amplification stages 45a, 45b with intermediate p-channel FETs 46a, 46b to provide amplified intermediate-voltage pulses to the gate 42 of the high power FET 40. Resistors 48a, 48b, 50a, 50b of a small resistance, preferably in the range of 1 to 2 Ω, are added to drains 52a, 52b, 54a and 54b, respectively. The sources 56a, 56b of the n-channel FETs 44a, 44b are grounded, while the sources 58a, 58b of the p-channel FETs 46a, 46b are connected to a positive bias voltage +$V_2$, preferably in the range of 12 to 15 V. Gates 60a, 60b of the n-channel FETs 44a, 44b are connected to the secondary coils of respective 1:1 turns ratio transformers 64a, 64b with the same polarization, while gates 62a, 62b of the p-channel FETs 46a, 46b are connected to the secondary coils of respective 1:1 turns ratio transformers 66a, 66b but with reverse polarization. Resistors 68a, 68b, 70a, 70b of a small resistance, preferably in the range of 5 to 20 Ω are, preferably connected between the transformers 64a, 64b, 66a, 66b and the gates 60a, 60b, 62a, 62b, respectively, to dampen possible ringing by the intermediate FETs 44a, 44b, 46a, 46b that could cause undesirable resonance interactions between them. The primary coils of the transformers 64a, 64b, 66a, 66b are connected to respective capacitors 72a, 72b, 74a, 74b to filter out DC components of pulses that are biased by a DC voltage. Although FIG. 2 shows two isolation-amplification stages with n-channel FETs and two stages with p-channel FETS, more stages of the same configuration may be added in parallel if desired to provide amplified pulse signals to the gate 42 of the high power FET 40.

The inputs to all isolation-amplification stages with n-channel FETs are connected to a pair of npn bipolar transistors 76a, 76b, while the inputs to all isolation-amplification stages with p-channel FETs are connected to a pair of pnp bipolar transistors 78a, 78b. Collectors 80a, 82a of the npn transistors 76a, 78a are connected to a bias voltage +$V_1$, which preferably has a positive DC voltage in the range of 12 to 15 V. Collectors 80b, 82b of the pnp transistors 76b, 78b are grounded. The emitters 84a, 86a of the npn transistors 76a, 78a are respectively connected to the emitters 84b, 86b of the pnp transistors 76b, 78b to form two nominally identical pairs of bipolar transistors, one pair for n-channel FET isolation-amplification stages and the other for p-channel FET isolation-amplification stages. The connected emitters 84a, 84b feed pulse signals to the n-channel FET stages, while the connected emitters 86a, 86b feed pulse signals to the p-channel FET stages. The bipolar transistor pairs form push-pull switching circuits which provide driving pulses to the isolation-amplification stages.

Bases 88a, 88b of the paired transistors 76a, 76b are connected to a high speed driver 92, and bases 90a, 90b of the paired transistors 78a, 78b are connected to another high speed driver 94. The high speed drivers 92, 94 are ICs that contain a plurality of solid state amplifier circuits capable of fast rise and fall times. They are preferably Elantec High Speed Drivers of the type "EL7104CN" MOSFET ICs. The drivers 92, 94 have respective input pairs 96, 98 and 100, 102, which may be connected directly to receive input pulse signals. In a preferred embodiment that separates the rise and fall of the drive pulses and controls the pulse rise and fall times, thereby retaining a desired pulse shape, diodes 112, 114 directed in opposite directions are respectively connected through resistors 104, 106 to the two inputs 96 and 98 of the driver 92. The resistors 104, 106 are preferably of a small resistance of 5 Ω or less. Likewise, a pair of contra-directed diodes 116, 118 are preferably connected through respective resistors 108, 110 to feed input pulse signals to the inputs 100, 102 of the other driver 94. The two pairs of bipolar transistors 76a, 76b and 78a, 78b and their associated drivers 92, 94 along with their pulse-shaping diodes and resistors form preamplifier circuits 101a, 101b, respectively. These preamplifier circuits are isolated from large currents in the intermediate FETs 44a, 44b, 46a, 46b by the transformers 64a, 64b, 66a, 66b.

Figure 3:
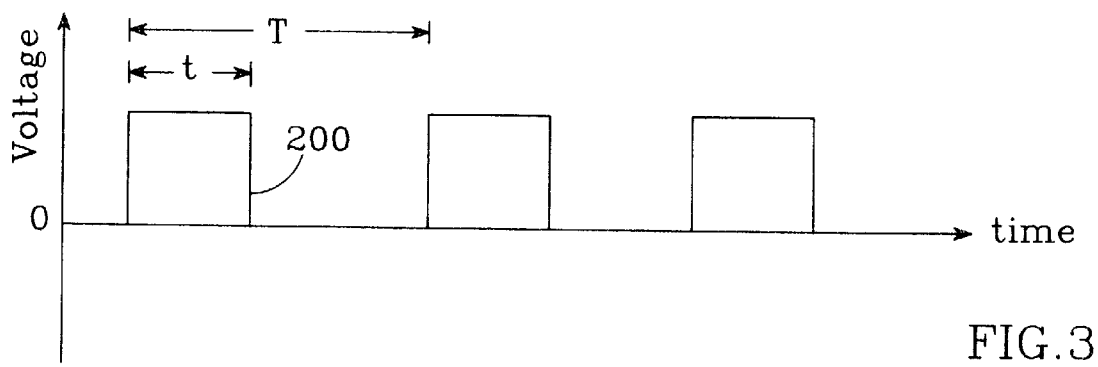
FIG. 3 is a plot of typical pulses provided to one of the driver circuits.

A signal source 120 generates pulses 200 with a substantially rectangular waveform, as illustrated in FIG. 3. The rectangular pulses generally have a pulse width t and a pulse repetition period T. The duty cycle is defined as t/T, and the pulse repetition rate is defined as 1/T. The signal source 120 need only generate pulses of a low voltage level, on the order of 5 volts, for example. FIG. 2 shows the signal source 120 connected to a transmitter 122, which transmits the pulses to a receiver 124 via a communication link 126. In this configuration, the signal source 120 is isolated by the communication link 126 from the high voltages and currents in the driver circuits to enter the signal source 120 to prevent damaging the signal source. The transmitter 122 and the receiver 124 preferably use fiber optic transmission and reception schemes, and the link 126 is preferably a fiber optic cable which achieves a high level of electrical isolation between the signal source 120 and the remainder of the driver circuit. The transmitter/receiver isolation scheme is required for the driver circuits 10a, 10c in FIG. 1 because they operate at a high DC voltage V+, typically on the order of +900 volts. For the driver circuits 10b, 10d in FIG. 1, which operate at lower voltage levels, the signal source 120 may be connected directly to the diodes 112, 114, 116, 118 in the driver circuit without isolation.

The rectangular pulses 200 in FIG. 3 are amplified by the driver circuits of FIG. 2 and the high power FET transistors 6a, 6b, 6c, 6d in the power stage circuit of FIG. 1. Each of the amplified rectangular pulses excites the LC resonator circuit 12, and causes it to "ring," that is, to generate an oscillating high voltage wave at the resonant frequency of the circuit 12. During the pulse width t, power is continuously supplied to the resonator circuit 12, and forces the voltage amplitude of the resonant sinusoidal wave to increase rapidly to a saturation level. The peak voltage level remains substantially constant thereafter until the pulse is turned off.

Figure 4:
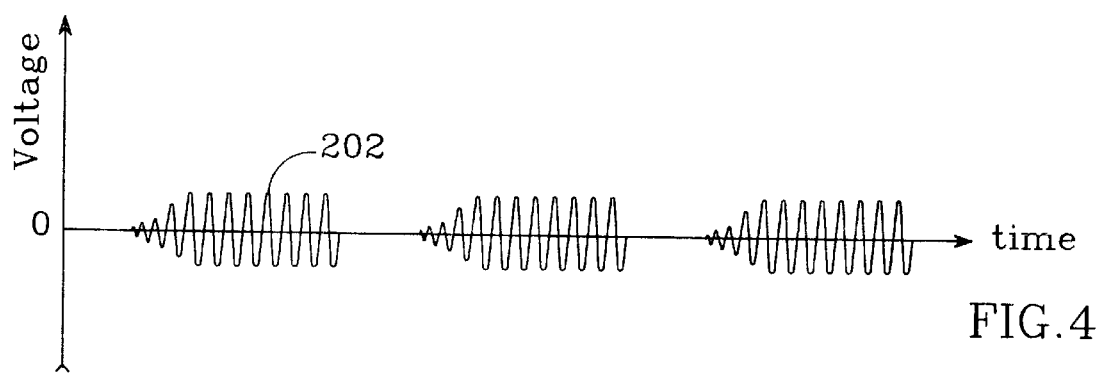
FIG. 4 is a plot of typical exhaust gas chamber voltages, showing multiple pulses in the time domain.
Figure 5:
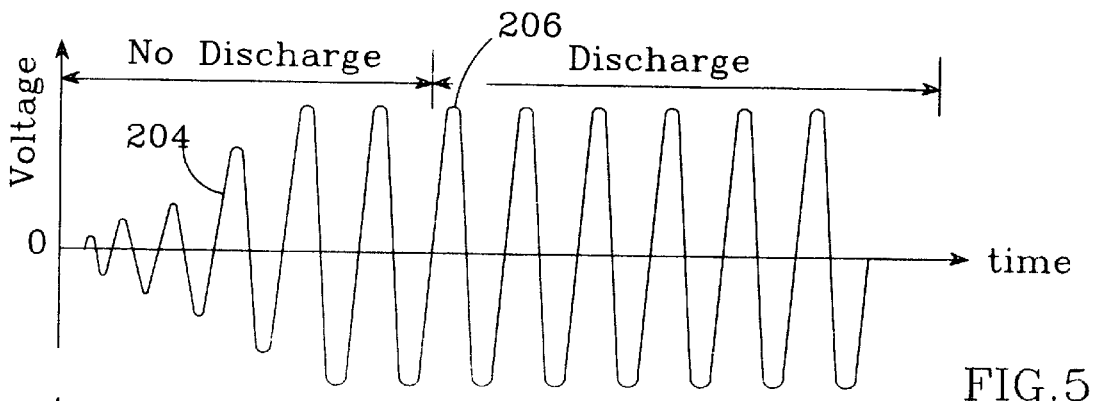
FIG. 5 is a plot on an expanded time scale of a portion of FIG. 4, showing sinusoidal waves energized by forced resonance within a single pulse.
Figure 6:
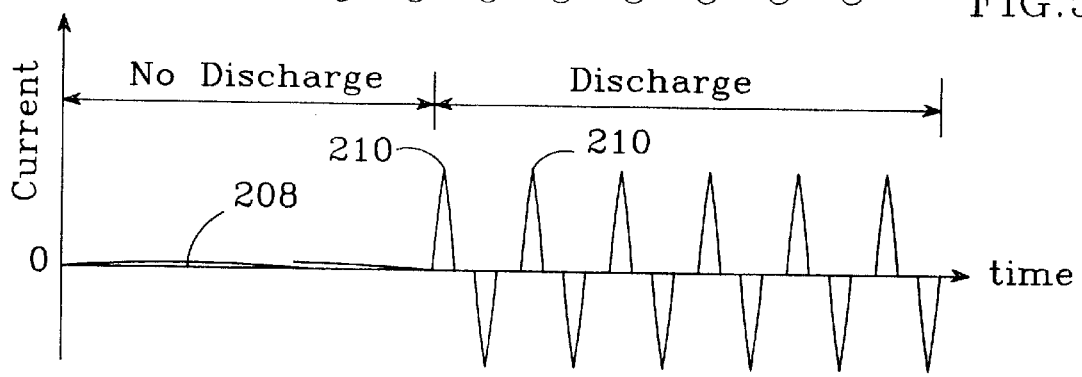
FIG. 6 is a plot of the typical current flowing across the exhaust gas chamber in the time domain.
Figure 7A:
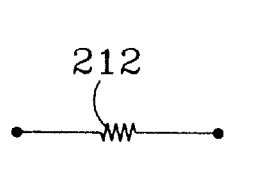
FIGS. 7a and 7b are equivalent circuits of a corona discharge reactor respectively without and during a discharge.

FIG. 4 shows a voltage waveform 202 across the corona discharge reactor 18 which results from the LC resonator circuit 12 being forced to resonate by the rectangular voltage pulses shown in FIG. 3. FIG. 5 shows the voltage waveform for one of the pulse periods of FIG. 4 expanded in the time domain, and illustrates the sinusoidal voltage 204 across the corona discharge reactor 18 generated by the forced resonance of a single pulse from the signal source 120. Initially, the amplitude of voltage 204 increases rapidly because of the ringing of the LC resonator circuit 12 forced by the pulse 200, but has not reached the voltage level necessary for corona discharge. There is no discharge within the corona discharge reactor chamber, and the current 208 across the reactor 18 is negligible, as shown in FIG. 6. The electrical characteristic of the corona discharge reactor during this period of no discharge may be represented by an equivalent circuit, shown in FIG. 7a, consisting of a single resistor 212 having a very high impedance. Alternatively, the corona discharge reactor may be regarded simply as an open circuit during the period of no discharge. When the voltage across the corona discharge reactor 18 reaches a certain breakdown level 206, corona discharge occurs, and a large current flows across the reactor 18. Because the voltage reaches the breakdown level 206 very close to the positive and negative peak of each sinusoidal lobe after the initial discharge, the current across the corona discharge reactor 18 appears as positive and negative spikes 210 because of the very short duration of each discharge. When the voltage falls below the breakdown level 206, the current across the reactor 18 rapidly returns to a negligible level.

Figure 7B:
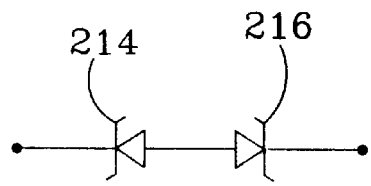

The electrical characteristic of the corona discharge reactor 18 during discharge may be represented by an equivalent circuit consisting of a pair of Zener diodes 214, 216 connected in series but with opposite polarities as illustrated in FIG. 7b. When either a positive or a negative voltage below breakdown is applied across the equivalent circuit, one of the diodes 214, 216 blocks any significant current flow. When the voltage reaches a breakdown level, current flows through the Zener diode pair 214, 216 as if it were nearly a short circuit.

Figure 8:
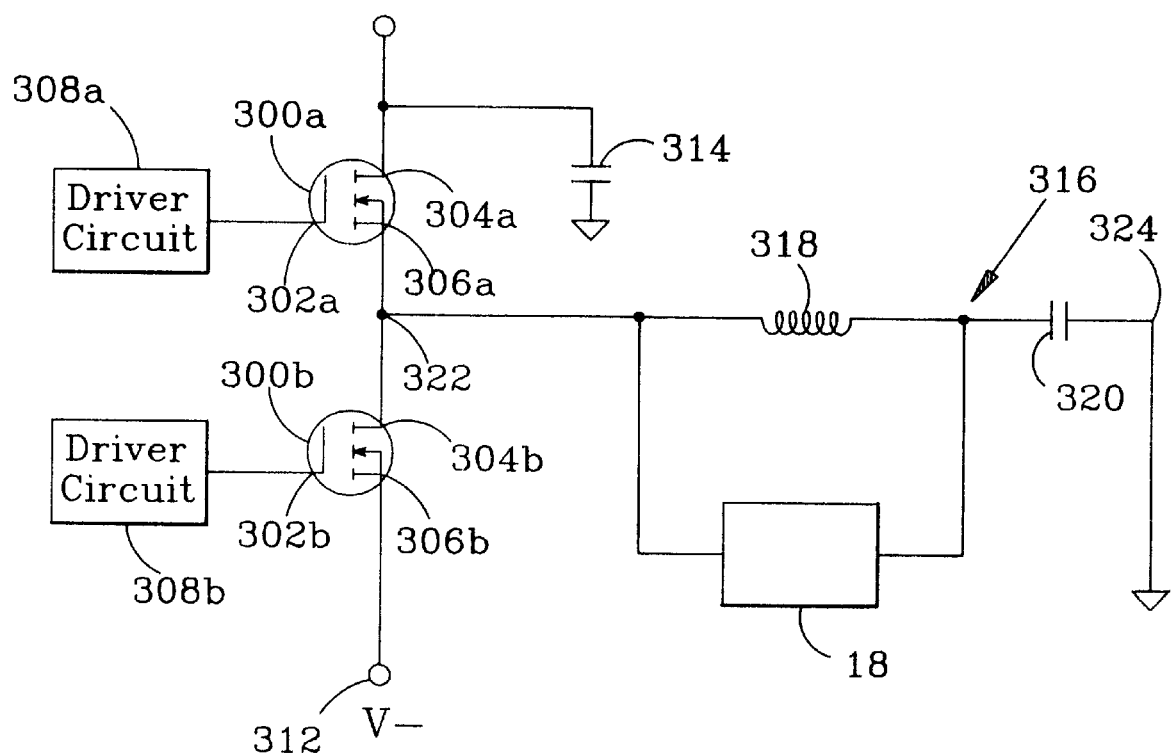
FIG. 8 is a schematic diagram of the power stage for another embodiment in which the power processor circuit has a half bridge configuration.

FIG. 8 shows a preferred embodiment of a power stage circuit in a "half bridge" configuration. Only two high power FETs 300a, 300b are required, and DC bias voltages of only about ±200 V need to be provided. The high power FETs 300a, 300b are preferably n-channel and have gates 302a, 302b, drains 304a, 304b, and sources 306a, 306b, respectively. It is further preferred that the high power FETs 300a, 300b are MOSFETs of industry type "DE375X2 501N40." The gates 302a, 302b of the FETS 300a, 300b are connected to respective driver circuits 308a, 308b, which provide initial amplification for the drive voltage pulses. The drain 304a of the first FET 300a is connected to a DC voltage source V+, which supplies a constant positive DC voltage V+ of preferably about +200 volts. A filter capacitor 314 is connected between V+ and ground to filter out the DC component of an amplified voltage waveform in which the DC component is generated by V+ to prevent V+ from short-circuiting to ground. The source 306b of the second FET 300b is connected to a negative DC voltage source V− of preferably about −200 volts. The source 306a of the first FET 300a and the drain 304b of the second FET 300b are connected together to form one node 322 of a resonator circuit 316, which preferably comprises an inductor 318 and a capacitor 320 connected in series. The opposite node 324 of the LC resonator circuit 316 is grounded. The inductor 318 is connected in parallel with a corona discharge reactor 18.

Figure 9:
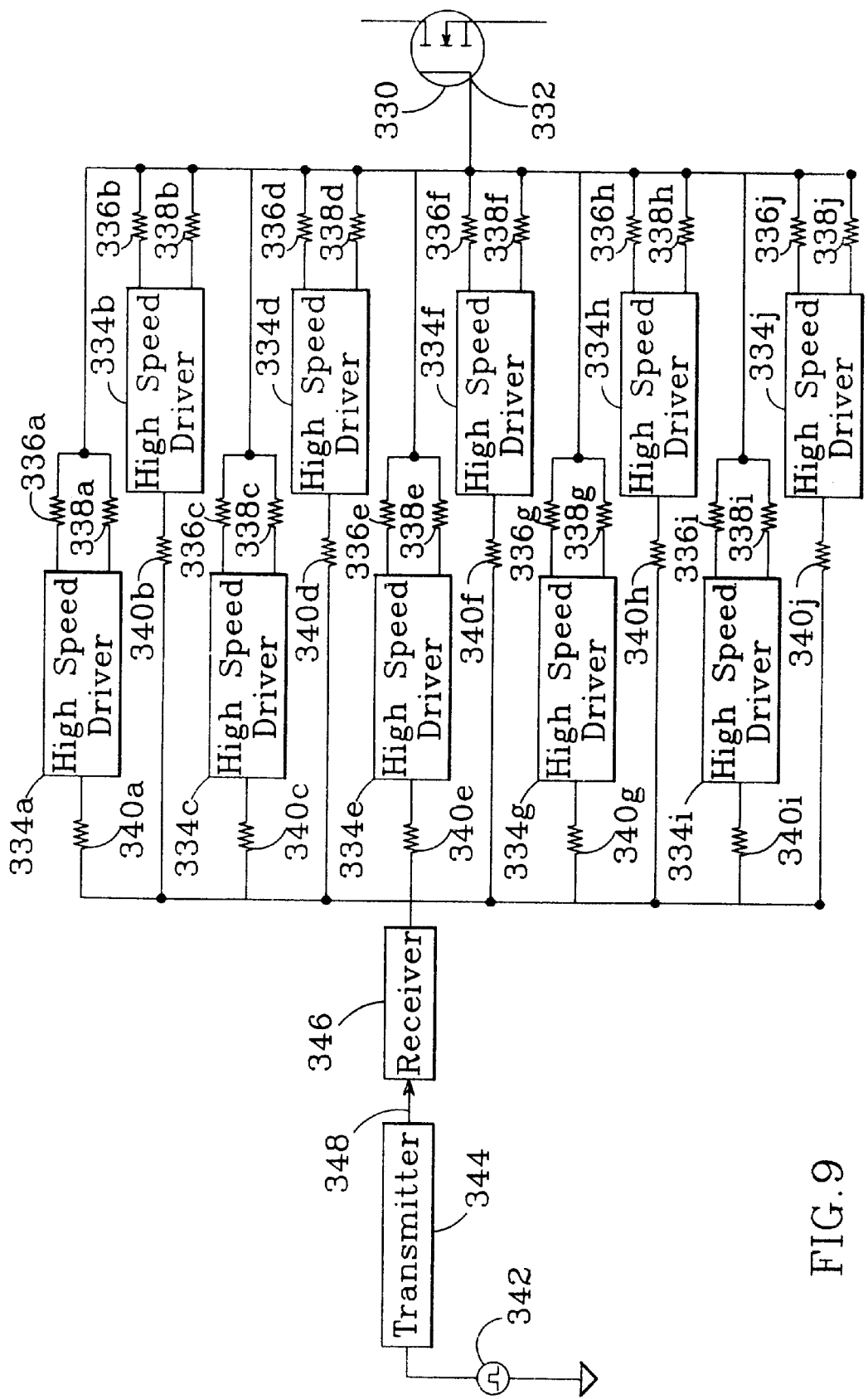
FIG. 9 is a schematic diagram of one of the driver circuits in the power processor circuit of FIG. 3, having a plurality of high speed drivers.

In a preferred embodiment, the driver circuits 308a, 308b each have a configuration shown in FIG. 9 to amplify relatively low drive voltage pulses to an intermediate voltage level. A high power FET 330, which represents one of the FETs 300a, 300b in FIG. 8, has a gate 332 connected to the driver circuit, which comprises multiple high speed drivers 334a, 334b, . . . 334j connected in parallel with each other. It is preferred that the high speed drivers 334a, 334b, . . . 334j be MOSFET IC devices, preferably Elantec High Speed Drivers of the type "EL7104CN." These high speed drivers 334a, 334b, . . . 334j each have two outputs connected to respective parallel resistors 336a, 336b, . . . 336j, 338a, 338b, . . . 338j of a low resistance, preferably on the order of 2.7 Ω. These resistors are connected to the gate 332 of the FET 330, so that amplified voltage pulses from the parallel high speed drivers 334a, 334b, . . . 334j are sent to the gate 332 of the high power FET 330 simultaneously. The high speed drivers 334a, 334b, . . . 334j also have respective inputs connected through respective input resistors 340a, 340b, . . . 340j to receive relatively low voltage pulse signals. In a preferred embodiment that protects a low-voltage signal source 342 from potential damage by high electrical power from the driver circuit, pulses from signal source 342 are delivered by an optical transmitter 344 to an optical receiver 346 via a fiber optic cable 348. The receiver 346 is connected to the input resistors 340a, 340b, . . . 340j to send received pulse signals to the high speed drivers 334a, 334b, . . . 334j. Preferably, the pulses generated by the signal source 342 are of a substantially rectangular shape in the time domain. The signal source 342 need only generate pulses at a low voltage level, on the order of 5 volts, for example. This isolation scheme is used for both driver circuits 308a, 308b in FIG. 8.

Figure 10:
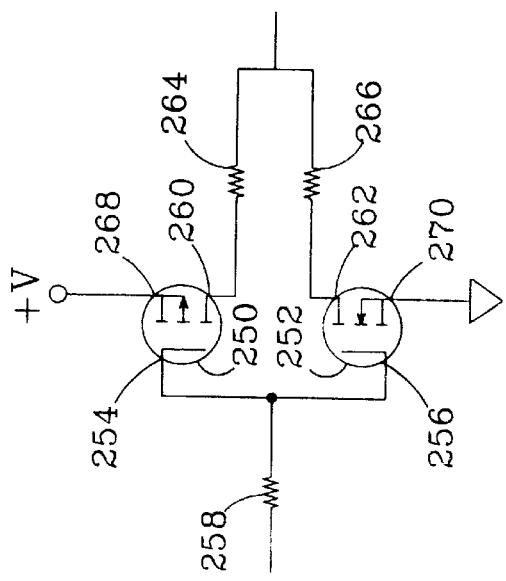
FIG. 10 is a schematic diagram of an alternate embodiment for one of the high speed drivers used in FIG. 4.

In an alternate embodiment shown in FIG. 10, a pair of discrete FETs are used in place of each of the high speed drivers 334a, 334b, . . . 334j of FIG. 9. A p-channel FET 250 and an n-channel FET 252 have gates 254, 256 connected to an input resistor 258 for receiving input pulse signals, and drains 260, 262 connected to respective output resistors 264, 266 for output to the power stage. The source 268 of the p-channel FET 250 is connected to a positive DC voltage +V₁, while the source 270 of the n-channel FET 252 is grounded. Although this circuit basically performs the equivalent functions of a high speed driver, it is more cumbersome to build and its operation is less reliable than the high speed drivers 334a, 334b, . . . 334j of FIG. 9.

In the preferred embodiment of the "half bridge" circuit of FIG. 8, the amplified rectangular pulses 200 of FIG. 3 force the LC resonator circuit 316 to resonate, thereby generating a voltage across the corona discharge reactor 18 with a wave pattern 202 generally shown in FIG. 4. As in the embodiment of FIG. 1, the amplitude of the voltage wave 204 increases rapidly at the start of each pulse, as shown in FIG. 5, but is not high enough to generate a corona discharge. As shown in FIG. 6, almost no current 208 passes through the corona discharge reactor 18 in the absence of a corona discharge. When the voltage wave reaches a breakdown level 206 close to the peaks, corona discharges are generated and very large currents rapidly flow through the reactor 18, with each breakdown lasting a very short duration corresponding to the current spikes 210 in FIG. 6.

Figure 11:
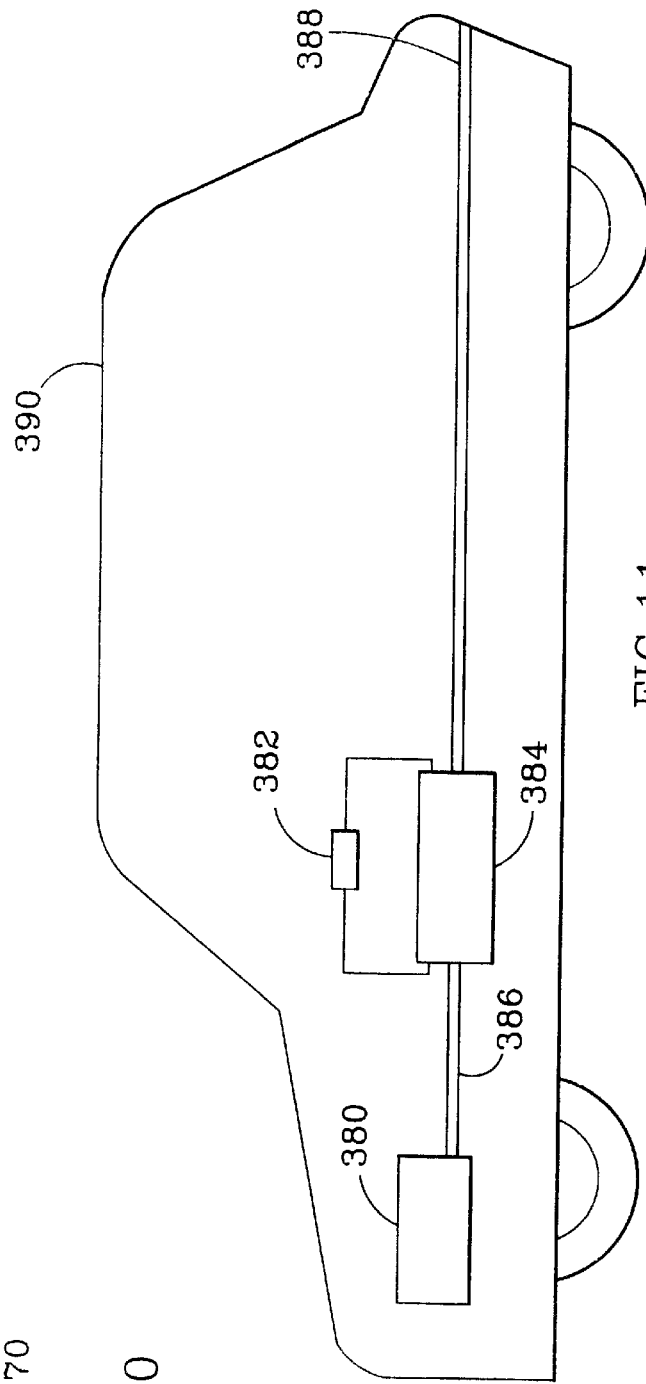
FIG. 11 is a block diagram of an automobile that includes a power processor circuit in accordance with the invention that supplies power for corona discharge to treat engine exhaust gas.

FIG. 11 shows the implementation of a power processor circuit 382 in accordance with the invention in an automobile 390, which has an internal combustion engine 380 that generates a pollutant-bearing exhaust gas. The exhaust gas is transferred through an exhaust conduit 386 to a corona discharge reactor 384, which destroys the pollutants in the exhaust gas by corona discharge. The power processor circuit 382 supplies high voltage pulses to the reactor 384 to enable corona discharge generation. The treated exhaust gas exits the reactor through an outlet conduit 388.

This invention provides a compact power source for corona discharge generation in automotive applications, and is particularly applicable to future electronic catalytic converters which employ corona discharge reactors to meet stringent air quality standards. The circuits embodied in this invention use only solid-state components, which would result in great savings in weight, cost and energy consumption, thereby making them suitable for automobile applications.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for generating a corona discharge from relatively low voltage pulses, comprising:

amplifying said relatively low voltage pulses to generate relatively high voltage pulses;

applying said relatively high voltage pulses to establish respective time-spaced relatively high voltage resonant AC voltage waveforms having peak voltage magnitudes that Progressively increase to a saturation level and thereafter maintain said saturation level for the duration of their respective relatively high voltage pulses; and generating substantially equal current, time-spaced corona discharges by said relatively high voltage waveforms while said waveforms are at their saturation levels.

2. The method of claim 1, wherein said relatively low voltage pulses are initially amplified to generate intermediate voltage pulses, and said intermediate voltage pulses are further amplified to generate said relatively high voltage pulses.

* * * * *